(12) United States Patent
Miks et al.

(10) Patent No.: US 10,221,563 B2
(45) Date of Patent: Mar. 5, 2019

(54) CONTINUOUS WALL ASSEMBLIES AND METHODS

(71) Applicant: JOHNS MANVILLE, Denver, CO (US)

(72) Inventors: Kathryn Fink Miks, Littleton, CO (US); Ralph Michael Fay, Lakewood, CO (US); Thomas S Calzavara, Littleton, CO (US); Francis John Babineau, Jr., Parker, CO (US)

(73) Assignee: Johns Manville, Denver, CO (US)

( * ) Notice: Subject to any disclaimer, the term of this patent is extended or adjusted under 35 U.S.C. 154(b) by 1 day.

(21) Appl. No.: 15/495,280

(22) Filed: Apr. 24, 2017

(65) Prior Publication Data

US 2017/0226734 A1 Aug. 10, 2017

Related U.S. Application Data

(63) Continuation of application No. 15/284,209, filed on Oct. 3, 2016, which is a continuation of application
(Continued)

(51) Int. Cl.
*E04B 2/56* (2006.01)
*E04B 2/02* (2006.01)
(Continued)

(52) U.S. Cl.
CPC .............. *E04B 2/562* (2013.01); *E04B 1/40* (2013.01); *E04B 1/4171* (2013.01); *E04B 1/66* (2013.01);
(Continued)

(58) Field of Classification Search
CPC ... E04B 2/58; E04B 2/70; E04B 2/707; E04B 1/7608; E04B 1/7612; E04B 1/762; E04B 1/7633; E04B 1/7637
See application file for complete search history.

(56) References Cited

U.S. PATENT DOCUMENTS

| 4,037,006 A | 7/1977 | Roberts et al. |
| 4,122,203 A | 10/1978 | Stahl |

(Continued)

OTHER PUBLICATIONS

3M Industrial Adhesives and Tapes Division, Bringing better ideas to the surface; 3M Masking and Surface Protection Products, Design & Production Guide, Jun. 2015, p. 1-60.

*Primary Examiner* — Ryan D Kwiecinski
*Assistant Examiner* — Matthew J Gitlin
(74) *Attorney, Agent, or Firm* — Robert D. Touslee

(57) ABSTRACT

According to one embodiment, an insulated structure includes a frame comprising a plurality of wall studs coupled together and a plurality of foam boards attached to the frame to form a continuous insulative wall. A plurality of fasteners attaches the foam boards to the frame. Each fastener includes an elongate shaft and a cap. The elongate shaft is configured to penetrate through a foam board and into a wall stud to couple the components together. The cap is configured to be positioned atop a foam board to distribute a load relatively evenly to the foam board. A sealing tape is applied across seams between adjacent foam boards and over the fasteners' caps to seal the wall. A sealing caulk is applied to secondary fasteners and penetrations to seal the wall. In some embodiments, the structure has a fastener density of about 1 fastener per 243 in$^2$ of foam board.

18 Claims, 8 Drawing Sheets

Related U.S. Application Data

No. 13/900,063, filed on May 22, 2013, now Pat. No. 9,469,984.

(51) Int. Cl.

| | | |
|---|---|---|
| *E04B 2/30* | (2006.01) | |
| *E04B 1/41* | (2006.01) | |
| *E04B 1/66* | (2006.01) | |
| *E04B 1/76* | (2006.01) | |
| *E04B 1/80* | (2006.01) | |
| *E04B 2/00* | (2006.01) | |
| *E04F 13/08* | (2006.01) | |
| *E04F 13/14* | (2006.01) | |

(52) U.S. Cl.
CPC ............. *E04B 1/7637* (2013.01); *E04B 1/80* (2013.01); *E04B 2/02* (2013.01); *E04B 2/30* (2013.01); *E04C 2/46* (2013.01); *E04F 13/0833* (2013.01); *E04F 13/14* (2013.01); *E04B 2002/0245* (2013.01); *E04B 2002/565* (2013.01)

(56) References Cited

U.S. PATENT DOCUMENTS

| | | | |
|---|---|---|---|
| 4,133,930 A | | 1/1979 | Wright et al. |
| 4,578,915 A | | 4/1986 | Schneller |
| 4,817,355 A | | 4/1989 | Tilsley et al. |
| 4,936,071 A | | 6/1990 | Karrfalt |
| 4,944,416 A | | 7/1990 | Petersen et al. |
| 5,080,950 A | | 1/1992 | Burke |
| 5,118,235 A | * | 6/1992 | Dill .................. E04D 3/3603 411/368 |
| 5,367,847 A | | 11/1994 | Hepler |
| 5,695,870 A | | 12/1997 | Kelch et al. |
| 6,035,595 A | | 3/2000 | Anderson |
| 6,044,604 A | | 4/2000 | Clayton et al. |
| 6,145,272 A | | 11/2000 | Tomaini |
| 6,205,729 B1 | | 3/2001 | Porter |
| 6,358,599 B1 | | 3/2002 | Deibel et al. |
| 6,854,228 B2 | | 2/2005 | Arseneau et al. |
| 6,904,731 B2 | | 6/2005 | Wardle et al. |
| 7,735,271 B1 | * | 6/2010 | Shipston .................. B32B 5/18 52/169.11 |
| 8,161,699 B2 | | 4/2012 | LeBlang |
| 8,176,696 B2 | | 5/2012 | LeBlang |
| 8,215,083 B2 | | 7/2012 | Toas et al. |
| 8,313,818 B2 | | 11/2012 | Vo et al. |
| 8,397,465 B2 | | 3/2013 | Hansbro et al. |
| 8,572,918 B1 | | 11/2013 | Zhou et al. |
| 8,863,442 B2 | * | 10/2014 | Freeman .................. E04D 5/145 52/23 |
| 8,966,845 B1 | | 3/2015 | Ciuperca et al. |
| 2001/0030138 A1 | * | 10/2001 | Bruins .................... B25C 1/006 206/343 |
| 2003/0037506 A1 | * | 2/2003 | Seibert .................. E04B 1/7608 52/698 |
| 2003/0056456 A1 | | 3/2003 | Heydon |
| 2004/0216408 A1 | * | 11/2004 | Hohmann, Jr. ....... E04B 1/4178 52/426 |
| 2005/0183261 A1 | * | 8/2005 | Nebesnak ............... E04D 5/142 29/525.01 |
| 2006/0005490 A1 | * | 1/2006 | Hohmann, Jr. ....... E04B 1/4178 52/293.3 |
| 2007/0142692 A1 | | 6/2007 | Hall et al. |
| 2009/0098357 A1 | | 4/2009 | Bergold et al. |
| 2009/0113831 A1 | | 5/2009 | DeWildt |
| 2010/0028668 A1 | | 2/2010 | Janda |
| 2010/0037549 A1 | | 2/2010 | Lynch et al. |
| 2011/0047919 A1 | * | 3/2011 | Hohmann, Jr. ....... E04B 1/4178 52/513 |
| 2011/0078971 A1 | | 4/2011 | Adams |
| 2011/0162295 A1 | | 7/2011 | Cottier et al. |
| 2011/0250035 A1 | | 10/2011 | Goldberg et al. |
| 2011/0258944 A1 | | 10/2011 | Radoane |
| 2012/0137610 A1 | | 6/2012 | Knight et al. |
| 2012/0144765 A1 | | 6/2012 | LeBlang |
| 2012/0174512 A1 | | 7/2012 | LeBlang |
| 2012/0186174 A1 | | 7/2012 | LeBlang |
| 2012/0186180 A1 | | 7/2012 | LeBlang |
| 2012/0324815 A1 | | 12/2012 | Schiffmann et al. |
| 2013/0055669 A1 | * | 3/2013 | Olszewski ................ B32B 3/06 52/283 |
| 2015/0121792 A1 | * | 5/2015 | Spoo ..................... E04B 1/4178 52/483.1 |
| 2017/0175395 A1 | * | 6/2017 | Freeman ................. E04D 15/04 |

* cited by examiner

CONTINUOUS WALL ASSEMBLIES AND METHODS

CROSS REFERENCE TO RELATED APPLICATION

The present application is a continuation of U.S. Nonprovisional patent application Ser. No. 15/284,209, filed Oct. 3, 2016, which is a continuation of U.S. Nonprovisional patent application Ser. No. 13/900,063, filed May 22, 2013, now U.S. Pat. No. 9,469,984, issued Oct. 18, 2016.

BACKGROUND OF THE INVENTION

Construction of modern buildings constantly focus on manners of increasing energy efficiency in order decrease energy consumption while providing comfort to occupants. To increase a building's thermal efficiency, insulation is often applied to the outer and/or inner surfaces of the building. To further increase the thermal efficiency, air barriers are often created to minimize the flow of air between the surrounding environment and the building's interior. One construction technique for providing an air barrier is by building a continuous insulation wall assembly. Such wall assemblies are required under the 2012 International Energy Conservation Code, which has been adopted by five States.

In conventional continuous insulation wall assembly building techniques, sealants are often used to produce the desired air barrier. For example, foam insulation materials are often applied between wall studs to seal seams or cracks between adjacent cover boards and/or to seal seams between the cover board and one or more penetrations through the cover board, such as windows, doors, ducts, and the like. Other common components that may be sealed with foam insulation materials are fasteners that are inserted through the cover board to attach the cover board to one or more wall studs. Without these products in conventional building techniques (e.g., the foam insulation materials), the air barrier is often not created, which may dramatically affect the overall thermal efficiency of the building.

BRIEF SUMMARY OF THE INVENTION

Embodiments described herein provide multi-functional wall assemblies that function as thermal barriers, water-resistive barriers, vapor barriers, and air barriers. According to one embodiment, a method for providing a continuously insulated wall is provided. The method includes providing a frame that includes a plurality of structural support members (e.g., wall studs) attached or coupled together. The method also includes coupling a plurality of insulative foam boards to the frame so as to form a continuous insulative wall or surface of the structure. The plurality of insulative foam boards may comprise one or more layers of insulative foam boards. The plurality of insulative foam boards are coupled to the frame via a plurality of fasteners that have an elongate shaft portion that penetrates through a respective insulative foam board and into a respective structural support member to attach the respective insulative foam board to the respective structural support member.

The fastener including a cap portion having between a 0.5 and 2 inch radius as measured from the elongate shaft. The cap portion is positioned atop the respective insulative foam board when the fastener is inserted through the insulative foam board and into a respective structural support member so as to distribute an applied load relatively evenly to the insulative foam board. The fasteners are applied to the insulative foam board so as to have a spacing between adjacent fasteners of between approximately 16 to 24 inches. The method further includes applying a sealing tape across seams between adjacent foam boards and across at least some, and preferably all, the capped fasteners to seal the continuous insulative wall or surface. The sealing tape has a tape width of about 3 to 6 inches and is able to elongate or deform when under tension or shear. The continuous insulative wall or surface provides an air barrier that restricts a passage of air through the wall to less than about 0.2 $L/(s\text{-}m^2)$ at a pressure of 75 Pa. The continuous insulative wall or surface additionally resists the transport of water vapor by diffusion by having a water vapor permeability less than or equal to 1 U.S. perm (1 $grain/hr\text{-}ft^2\text{-}inHg$).

The method may additionally include coupling cladding to the frame to form an exterior wall of the structure that is protective and visually pleasing. The cladding may be coupled to the frame via a second plurality of fasteners that are attachable to the cladding, that extend through respective insulative foam boards, and that attach to respective structural support members. The cladding may be offset from the insulative foam boards so as to form an air gap between the insulative foam boards and the exterior cladding.

In some embodiments, the continuously insulated wall includes a hollow cavity between adjacent structural support members (e.g., wall studs). The hollow cavity may be approximately equal in length to the structural support members. In some embodiments, the method may further include positioning a plurality of sheathing panels between the frame and the insulative foam boards prior to coupling the insulative foam boards with the frame. In other embodiments, the insulative foam boards may be positioned directly adjacent the frame. The method may additionally include coupling a plurality of wallboards to the frame so as to form an interior wall of the structure.

According to another embodiment, a method for insulating a structure is provided. The method includes coupling a plurality of structural support members (e.g., wall studs and the like) together to form a frame for a wall or ceiling. The method also includes coupling a plurality of insulative foam boards to the frame to form a continuous insulative wall or surface. The plurality of insulative foam boards are coupled to the frame via a plurality of fasteners having an elongate shaft that is insertable through a respective insulative foam board and into a respective structural support member to attach the respective insulative foam board to the respective structural support member. The fastener includes a cap that extends radially from the elongate shaft and that is positionable atop the respective insulative foam board to distribute an applied load relatively evenly about the insulative foam board. The method further includes applying a sealing tape across seams between adjacent insulative foam boards and over the cap, and/or applying a sealing caulk around insulative foam board penetrations, to seal the continuous insulative wall or surface such that the continuous insulative wall or surface forms an air barrier to restrict a passage of air through the wall to less than about 0.2 $L/(s\text{-}m^2)$ at a pressure of 75 Pa and to provide the exceptional structural integrity during extreme pressure loads.

According to another embodiment, an insulated structure is provided. The insulated structure includes a frame having a plurality of structural support members coupled together. The insulated structure also includes a plurality of insulative foam boards that are attached to the frame to form a continuous insulative wall or surface of the structure. The insulated structure further includes a plurality of fasteners that attach the insulative foam boards to the frame. Each fastener includes an elongate shaft that is configured to penetrate through a respective insulative foam board and into a respective structural support member to couple the components together. Each fastener also includes a cap that extends radially from the elongate shaft. The cap is positionable atop the respective insulative foam board to distribute an applied load relatively evenly to the insulative foam board. The insulated structure additionally includes a sealing tape that is applied across seams between adjacent insulative foam boards and over the cap of the fastener, and/or applying a sealing caulk around insulative foam board penetrations, to seal the continuous insulative wall or surface such that the continuous insulative wall or surface forms an air barrier to restrict a passage of air through the wall. The insulated structure comprises a fastener density of about 1 fastener per 243 to 354 $in^2$ of insulative foam board.

In some embodiments, the insulated structure additionally includes a hollow cavity between adjacent structural support members (e.g., wall studs and the like). The hollow cavity may be approximately equal in length to the structural support members. In some embodiments, the insulated structure additionally includes exterior cladding that is positioned adjacent an exterior surface of the insulative foam boards. The cladding is coupled with the frame so as to form an exterior wall of the structure that is protective and visually pleasing.

The exterior cladding may be coupled to the frame via a second plurality of fasteners. The second plurality of fasteners may be attachable to the exterior cladding, extend through respective insulative foam boards, and attach to respective structural support members to couple the cladding to the frame. The second plurality of fasteners may have self-sealing ability, such as a rubber gasket, or a sealing caulk may be used to create a continuous air and water barrier surface. The exterior cladding may be offset from the insulative foam boards so as to form an air gap between the insulative foam boards and the exterior cladding.

In some embodiments, a plurality of sheathing panels may be positioned between the frame and the insulative foam boards. In other embodiments, the insulative foam boards may be positioned directly adjacent the frame so that sheathing panels are not positioned between the frame and the insulative foam boards. The insulated structure may also include a plurality of wallboards that are attached to the frame on an interior side thereof so as to form an interior wall of the structure.

BRIEF DESCRIPTION OF THE DRAWINGS

The present invention is described in conjunction with the appended figures.

Figure 1:
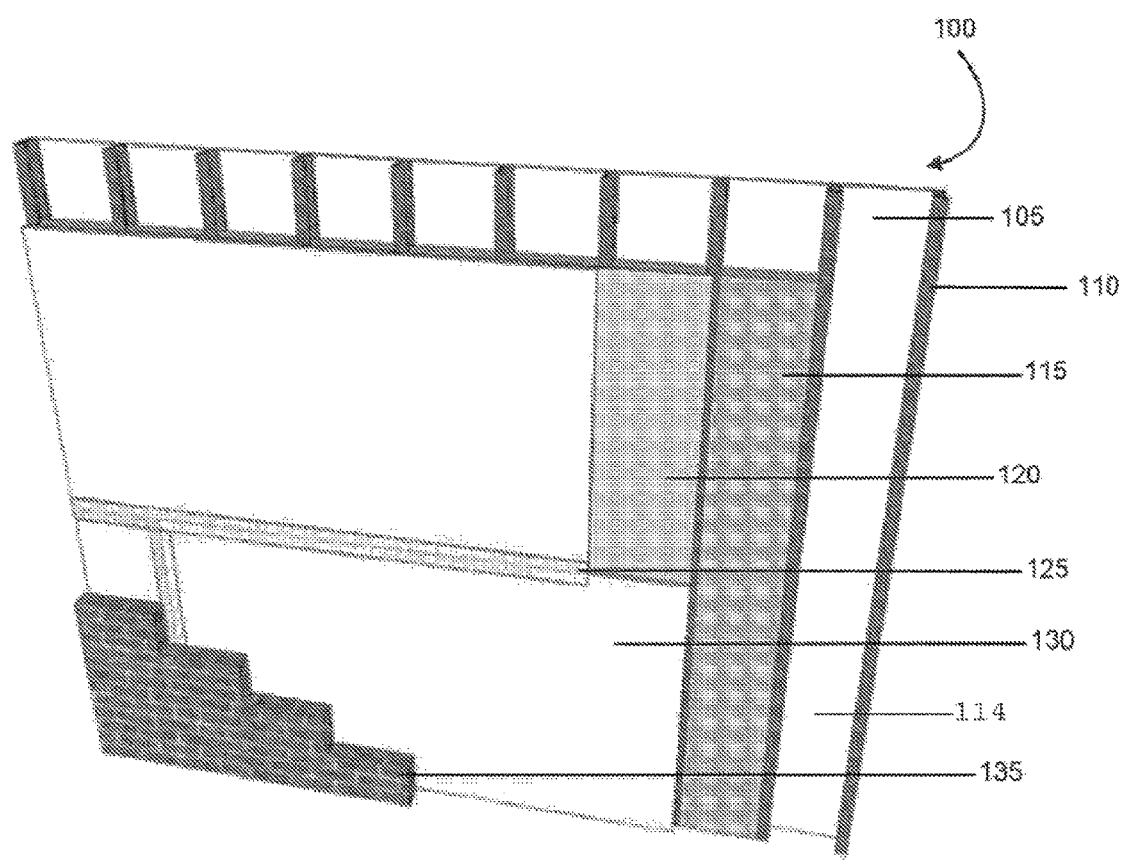
FIG. 1 is a perspective view of a continuous insulative wall assembly according to an embodiment.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments described herein provide multi-functional wall assemblies that function as thermal barriers, water-resistive barriers, vapor barriers, and air barriers, eliminating the need to install additional components (hereinafter continuous insulative wall assembly or wall assembly). The wall assemblies described herein achieve all of the aforementioned often without the use of spray polyurethane foam in the wall cavity. The wall assemblies described herein may also include or not include an exterior structural sheathing layer (e.g., gypsum layer) between the structural members and the exterior insulation layer. In some embodiments, if exterior structural sheathing is not used, then spray polyurethane foam cannot be placed in the wall cavity.

In several embodiments, an air barrier is created without placing materials, such as foam insulation and the like, between wall studs. For example, in several embodiments, foam insulation materials are not required to be sprayed or positioned between adjacent studs in a wall in order to effectively seal the wall and create an air barrier. Rather, the wall systems described herein may include a foam board that is coupled directly with the wall studs without the use of spray foam insulation materials and/or exterior sheathing. These systems may reduce the amount of material that is required for the wall system and thereby reduce the overall building cost and/or installation time.

In conventional wall assembly techniques, cover boards (e.g., OSB, Foam Boards, and the like) are typically placed atop wall studs. A two step process is often required to provide a building with both insulation and an air barrier. For example, to provide the air barrier, an exterior wall surface is typically prepped to remove all dust and debris. A primer is then applied to seams in the exterior wall surface and finally a tape material (e.g., flashing tape) is applied over the seams to seal any cracks, seams, or other openings. The surface prep and primer process is typically necessary to ensure that the tape material sticks to the exterior wall surface. Often, the primer must completely dry before the tape material is applied and/or one or more coats of primer may be required to ensure that the tape material adequately adheres to the exterior wall surface. This process is time consuming and expensive.

The foam boards that are often attached to the wall studs in wall assemblies typically have the ability to expand by up to 1% based on temperature fluctuations. Such expansion may cause seams or cracks in the foam board to develop or widen after installation. For example, a 96 inch long board foam board that experiences a 1% expansion due to temperature may expand by as much as 1 inch. If an adjacent board expands by a similar margin, a significant gap between the boards may develop. The expansion may strain the tape material that is placed over the seam between the adjacent boards, which may cause or increase air leakage into the building. The fasteners that are used to attach the foam boards to the wall may facilitate to restrict the expansion and contraction of the foam boards about the wall. As described previously, air leakage into the building greatly affects the building's thermal efficiency. To reduce or eliminate air leakage, conventional systems often place an air barrier material between wall studs or joists. For example, foam materials are often sprayed between wall studs and allowed to solidify to seal any cracks or seams in the wall. Some conventional assembly techniques often require the use of asphalt based products, which degrade over time. As a temperature approaches the softening point of the asphalt based products, the asphalt can delaminate and create gaps or seams that allow further air leakage into the building. This is especially true for south facing walls where the space between the cladding and the taped foam sheathing can routinely experience temperatures approaching 140° F. Also of importance is the air seal at the second fasteners, or cladding fasteners, where tape or a rubber grommet of the fastener may provide a primary seal and sealant applied around the foam board and second fastener may provide a secondary seal. In some embodiments, the second fasteners may not include a rubber grommet.

Wall assemblies of a building may also be exposed to significant pressure fluctuation due to wind, ventilation equipment, and air buoyancy (stack effect). These pressure fluctuations can easily exceed 10 lbf/ft$^2$ (500 Pa) in a multi-story buildings and will stress and flex the air barrier shell, placing great demands on the taped foam board joints, the capped fasteners and secondary cladding fasteners. Due to these air pressure stresses, temperature expansion and contraction stresses and the other environment exposure stresses, the continuous exterior insulation that provides both an air barrier and weather resistant barrier must be robust enough to survive a multitude of physical challenges.

The wall assembly embodiments described herein do not require that sealant type materials, such as foam products, be positioned between wall studs or joists in order to seal an interior and create an effective air barrier. Rather, the air barrier is created by using impermeable foam board insulation and stretchable or deformable tape that is positioned over seams or gaps in the wall, and by using unique fasteners. The stretchable or deformable tape is also placed over the fasteners since the penetration of the fastener through the foam board may elongate with pressure and/or temperature fluctuations. Placing the tape over these elongated fastener holes allows the holes to remain air tight such that the fastener provides a primary seal and the tape provides a secondary seal. In some embodiments, the tape comprises a stretchable plastic film with an acrylic adhesive. The acrylic adhesive has low temperature and high temperature capabilities that allow the tape to stay adhered longer and stretch as a board expands and contracts. In some embodiments, the tape has greater than 100% strain capability in both the machine direction and cross machine direction, and adhesion to the foam board surface of greater than about 60 oz per in. The stretchability and adhesion of the tape provides a more robust, durable, and long lasting wall assembly compared with conventional wall assemblies. The tape also delivers improved air barrier properties or sealing for an extended duration of time.

The fasteners have a relatively flat back and low profile compared with conventional fasteners. The fastener's cap includes a centrally located recess within which a screw, nail, or other fastening element is inserted. The fastening element is recessed from a top surface of the cap so as not to protrude axially outward from the cap. The cap also includes a relatively large radius (e.g., 0.5 to 2 inches and the like) as measured from the fastening element that functions to distribute a load relatively evenly across a board. The load distribution property of the fasteners allows fewer fasteners to be used in securing the cover board to wall studs. The foam insulation board, tape, caulk, and fasteners described herein create effective air barriers on the exterior side of the wall, whereas conventional assemblies form the air barrier on the interior side with foam or other sealants. Additional features will be realized with reference to the figures described below.

Wall Assembly Embodiments

Figure 2:
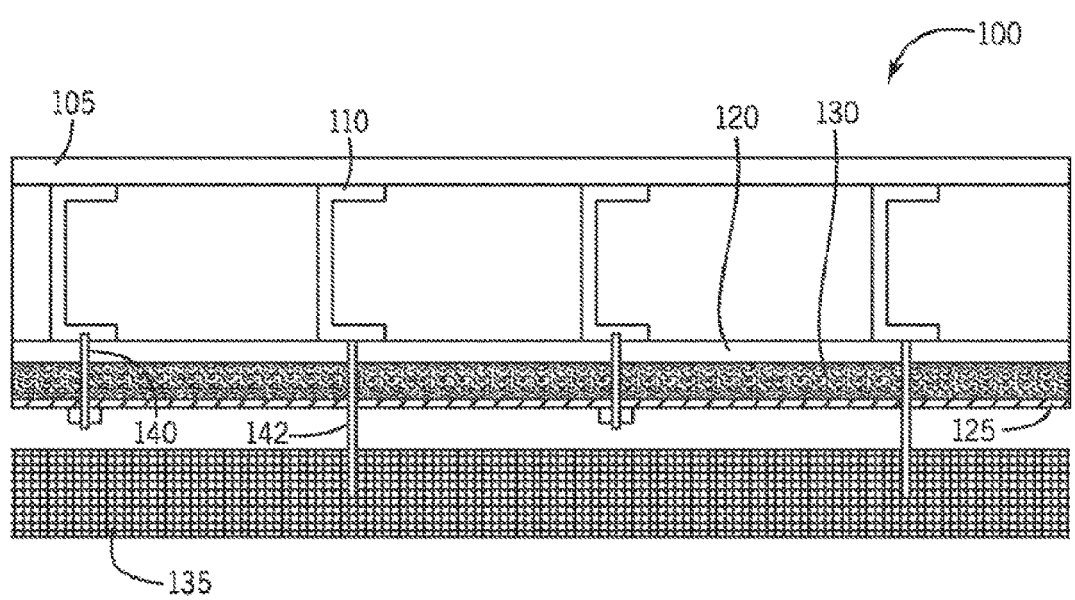
FIG. 2 is a top view of the continuous insulative wall assembly of FIG. 1.

Referring to FIGS. 1 and 2, illustrated are embodiments of a continuous insulative wall assembly 100 showing the various wall assembly components. FIG. 1 illustrates a perspective view of the continuous insulative wall assembly 100 while FIG. 2 illustrates a top view of the continuous insulative wall assembly 100. The continuous insulative wall assembly 100 includes an interior wallboard 105 that is coupled with a structural base (e.g., wall studs 110) to form an interior wall of the assembly 100. The wallboards 105 may include gypsum board, cement board, and the like. The structural base includes structural support members such as concrete, steel studs, wood studs, steel or wood joists, and the like. The structural support members are typically attached or coupled together at or near their ends to form a frame. In a specific embodiment, the structural base includes a steel-framed wall assembly using 3⅝-inch 18 gauge steel studs.

In some embodiments, exterior sheathing 120 may optionally be coupled with the wall studs 110 on a side opposite the wallboard 105. The exterior sheathing 120 may include gypsum panels, water resistant gypsum panels with glass mat facers (e.g., DENSGLASS® sheathing), oriented strand board, and the like. The exterior sheathing 120 may provide some structural support to the wall system 100. A plurality of insulative foam boards 130 (hereinafter foam boards 130) may then be positioned on an exterior surface of exterior sheathing 120 and coupled with wall studs 110. The foam boards 130 form a continuous exterior insulative surface for wall assembly 100. Although the embodiments herein generally refer to foam boards, it should be realized that any relatively rigid insulation with a smooth surface and impermeable facer may be used, such as expanded polystyrene (EPS), extruded polystyrene (XPS), mineral fiber boards with an underlayer of structural sheathing, and the like.

In some embodiments, the foam boards 130 may be positioned directly against the wall studs 110 and coupled thereto rather than positioning exterior sheathing 120 between the foam boards 130 and wall studs 110. In this manner, a component of the wall system 100 (i.e., exterior sheathing 120) may be eliminated without affecting the performance of wall assembly 100. This may reduce cost and/or installation time in preparing wall assembly 100. In some embodiments, the foam boards 130 may include foil-faced polyisocyanurate foam boards, foil-glass faced polyisocyanurate foam boards, plastic film faced polyisocyanurate foam boards, and the like. It is believed that many thickness and density combinations of plastic film faced, extruded polystyrene foam board would also work well to deliver the desired air barrier properties with the combination of fasteners, tape, and sealants used in the embodiments described herein. The foam boards 130 are relatively rigid and typically have a minimum thickness of about 1 inch. The foam boards 130 are also insulative and provide an R-value per inch of thickness of between about 4.0 and 7.0 to insulate the building's interior. In some embodiments, the foam boards 130 may not provide the same structural support as exterior sheathing 120, although in other embodiments the foam boards 130 may be configured to provide similar support to the exterior sheathing 120.

As shown in FIG. 1, gaps or seams exist between adjacent insulative foam boards 130. In order to effectively seal the gaps or seams, a sealing tape 125 is applied and adhered over the seams or gaps. As described previously, the sealing tape 125 has a relatively large width and elongation properties. In some embodiments the sealing tape 125 may have a width of between about 3 and 6 inches, although a width of about 4 inches is more common. In some embodiments, the tape has greater than 100% strain capability in both the machine direction and cross machine direction, and adhesion to the foam board surface of about 60 oz per in. The width and elongation properties of sealing tape 125 allow the wall assembly 100 to remain essentially air and water tight during and after exposure to extreme positive and negative pressure fluctuations. An example of a sealing tape 125 that may be suitable for application to foam boards 130 in the manner described herein is All Weather Flashing Tape 8067 manufactured by 3M Company. In addition to being positioned over seams or gaps between adjacent insulative foam boards 130, sealing tape 125 is also positioned around the seams or gaps formed between foam board 130 and one or more penetrations that protrude through the surface of the foam boards 130, such as pipes, ducts, vents, windows, doors, and the like. Sealing tape 125 effectively seals any seam or gap in or adjacent to the foam boards 130. Other tapes that have greater than 4% strain capability and adhesion to the foam board surface of about 60 oz per in would also function in specific climates and applications.

As shown in FIG. 2, insulative foam boards 130 and exterior sheathing 120 (when exterior sheathing is used in wall system 100) are attached to wall studs 110 via a fastener 140. In some embodiments, the wall studs 110 (e.g., structural steel and exterior wall studs) may be installed and braced as required. Exterior sheathing 120 may then be attached first with a separate fastener (not shown) and then the insulative foam boards 130 attached with fastener 140. In a specific embodiment, the foam boards 130 are positioned directly adjacent the wall studs 110, or in other words without positioning exterior sheathing 120 between the wall studs 110 and foam boards 130. Fastener 140 comprises an elongate shaft (see FIGS. 6A-D) that is inserted through a respective foam board 130 and exterior sheathing 120 and directly into a wall stud 110 to couple the foam board 130 and exterior sheathing 120 with the wall stud 110. Fastener 140 also includes a cap portion (see FIGS. 6A-D) that extends radially from the elongate shaft. The cap portion of fastener 140 is positioned atop the insulative foam board 130 and applies a load thereto as the elongate shaft is inserted within and coupled to the wall stud 110. The cap portion of fastener 140 is relatively large so as to distribute the load relatively evenly to the foam board 130. The load distribution of the cap portion of fastener 140 allows fewer fasteners 140 to be used compared with conventional wall assemblies.

Second fasteners 142 may then be inserted through the foam boards 130 and exterior sheathing 120 and directly into wall studs 110. Second fasteners 142 extend beyond the insulative foam boards 130 surface and are used to affix exterior cladding 135 to the wall assembly. Sealing tape 125 may then be positioned over the cap portion of the fasteners 140 so as to create an air barrier over fasteners 140 and prevent air leakage therethrough. The exterior cladding 135 may be positioned adjacent the exterior surface of the insulative foam boards 130. The cladding 135 is coupled with the wall studs 110 via second fasteners 142 to form an exterior wall that is protective and visually pleasing. The second fasteners 142 may include fasteners such as Blok-Lok™, 2-Seal™ Tie, Pos-I-Tie®, and the like. Cladding 135 may include brick, stucco, natural stone, artificial stone, terra-cotta, metal panels, metal composite material panels, fiber reinforced cement board, and the like. In some embodiments, the second fastener 142 may include a rubber-like flexible sealing grommet at the foam facing surface to fastener interface. The rubber-like flexible sealing grommet may function as a primary seal for the second fasteners 142 to provide a watertight and/or airtight barrier.

In some embodiments, the second fasteners 142 may be provided with a secondary seal. The secondary seal may reinforce the primary seal to create or provide the watertight and/or airtight barrier. For example, in some embodiments, sealing caulk may be applied to the second fasteners 142 to provide the secondary seal. The sealing caulk may be a low modulus silicone composition. In some embodiments, the sealing caulk may have a hardness of 15 Shore A, a tensile strength at maximum elongation of about 1.38 MPa (200 psi), a tensile strength at approximately 100% elongation of 0.24 MPa (35 psi), a tear strength of about 0.7 kN/m (40 pli), a peel strength of about 5.2 kN/m (30 pli), an elongation of greater than 100%, and a compression of about 50%.

In some embodiments, the cladding 135 may be attached to the wall studs 110 via second fasteners 142 so as to be offset from the foam boards 130 as shown in FIG. 2. Offsetting the cladding 135 from the foam boards 130 in this manner forms an air gap between the insulative foam boards 130 and cladding 135. Forming a gap between insulative foam boards 130 and cladding 135 may be important to allow drainage of water from the backside of cladding 135. For example, natural brick and stone cladding, or cladding that is made using classic brick making processes, may saturate with water during a rain storm or other event. The rain may saturate into the cladding 135 and pour down an interior side of the cladding 135. The gap or air channel between the foam boards 130 and cladding 135 allows for wall assembly 100 to have a stone exterior while providing a water drainage system. One or more drainage holes or pipes (not shown) may be positioned near the bottom of wall assembly 100 to drain water that runs down the interior or backside of cladding 135. The formed gap may be one of several methods used to rain proof wall assembly 100. The air gap created between the cladding 135 and foam boards 130 may be between about ½-1 inch. Cladding 135 may be hung via second fasteners 142 so as to have a relatively uniform appears or surface that will be viewed. This cladding surface allows the foam board 130 surface to have some degree of non-uniformity, since the foam board surface will be hidden from view by cladding 135. In some embodiments, a floor line fire-stop may be installed in the stud cavity. Insulation may then be installed within the stud cavity and/or exterior veneer applied if desired.

Cladding 135 is typically exposed to elemental or environmental factors, such as wind driven rain. Like most cladding, cladding 135 may exhibit some degree of leakage and/or may be porous enough so that some liquid water (generally from rain) is able to get behind the cladding 135. Further, when unsealed, like most cladding, wind driven rain may soak cladding 135 (e.g., bricks) and permit a significant amount of liquid water to run down the backside of the brick surface. Accordingly, in the embodiments described herein, the exterior side of the foam board 130 performs as a water resistive barrier as tested and described by AC71. As such, the embodiments described herein are able to perform as a water resistive barrier before testing, after ABAA air barrier testing, and after the extreme structural pressure testing.

As described above, one unique component of wall system 100 is the fact that the sealing materials, such as a foam material, need not be positioned within the assembly's wall cavity, such as between wall studs 110, to create an effective air barrier. Stated differently, the wall cavity between adjacent wall studs 110 may be hollow 114 or un-insulated without significantly affecting the air barrier. The hollow cavity may have a length that is approximately equivalent to the length of the wall studs 110. In this manner, the wall assembly 100's wall may be essentially hollow. Increased cost and installation savings may be realized by eliminating the material (e.g., foam insulation) that is typically positioned in the wall assembly's wall cavity. In some embodiments, insulation materials 115, such as fiberglass batt, spray-in fiber glass, and the like, may be positioned within the cavity between adjacent wall studs 110 as desired to further insulate the building.

Figure 3A:
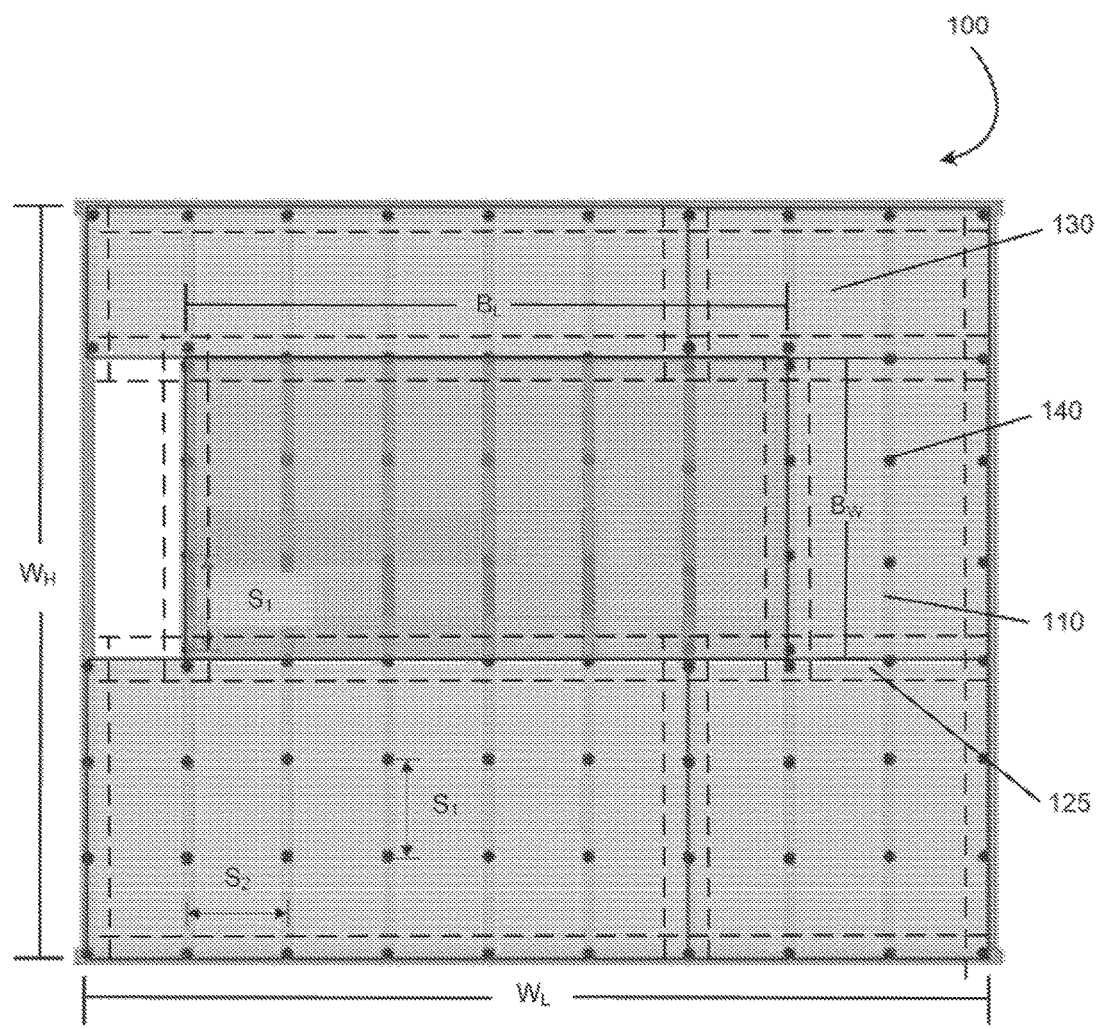
FIG. 3A is a front view of a continuous insulative wall assembly according to an embodiment.

Referring to FIG. 3A, illustrated is an embodiment of a continuously insulative wall assembly 100 that has been prepared as described previously with respect to FIGS. 1 and 2. The wall assembly 100 includes a plurality of wall studs 110 that are arranged and coupled to form a frame as described previously. Wall assembly 100 further includes a plurality of insulative foam boards 130 that are placed atop the wall studs 110 and coupled thereto via fasteners 140. Seams or cracks between adjacent foam boards 130 are sealed using a sealing tape 125 as previously described. The wall assembly 100 may have a width $W_L$ and a height $W_H$ that correspond to the dimensions of the building to be insulated. In one embodiment, a wall assembly 100 was prepared for testing having a width $W_L$ of about 116 inches and a height $W_H$ of also about 116 inches. The insulative foam boards 130 used in constructing the wall assembly 100 had a length $B_L$ of approximately 96 inches and a width $B_W$ of approximately 48 inches. An insulative foam board 130 having these approximate dimensions in relation to the wall assembly 100 is shown in the gray shaded portion of FIG. 3A. Other foam boards having other dimensions were also used to construct wall assembly 100, however, the dimensions of these boards are not important.

Fasteners 140 are arranged on wall assembly 100 to have an on-center vertical spacing $S_1$ and an on-center horizontal spacing $S_2$ of approximately 16 inches. On-center spacing as used herein describes a spacing between center points of the fasteners 140. The horizontal spacing $S_2$ of the fasteners 140 correspondence to an approximate distance between adjacent wall studs 110. The vertical spacing $S_1$ of 16 inches is far greater than a fastener spacing typically used in conventional wall assemblies. For example, fastener patterns of conventional wall assemblies typically include a fastener spacing of about 12 inches on-center all around the field, which results in a wall assembly having far more fasteners and a relatively high fastener density. The large diameter capped fasteners 140 described herein allow the fastening pattern to be extended to 16 inches on-center all around the field, which results in a wall assembly having far fewer fasteners and a relatively low fastener density.

In some embodiments, the wall assemblies described herein may include a fastener density of between about 1 fastener per 120 $in^2$ and about 1 fastener per 354 $in^2$ of insulative foam board 130. In a specific embodiment, the wall assemblies may include a fastener density of between about 1 fastener per 200 $in^2$ and 1 fastener per 256 $in^2$, and more commonly about 1 fastener per 230 $in^2$ and 1 fastener per 256 $in^2$. Typically, the greater the density of fasteners, the more coupled the foam boards 130 will be to wall studs 110, although the strength of the attachment may depend on the strength of the cap, screw, foam board (type and thickness), and fastening pattern, in addition to the fastener density. However, the greater the density of fasteners, the more the overall wall assembly will cost due to the increased number of fasteners and/or the longer installation time will be. In a specific embodiment, a fastener vertical and horizontal spacing, $S_1$ and $S_2$, about 16 inches has been shown to provide an ideal fastener density. The spacing of about 16 inches between fasteners results in a typical foam board 130 (i.e., a 96 inch by 48 inch foam board) having about 13 to 19 fasteners.

For example, in viewing the gray shaded foam board panel 130 of FIG. 3A, it is evident that the foam board 130 includes 10 fasteners 140 that are fully within the borders of the foam board. The foam board 130 also includes 18 fasteners 140 that are partially within the borders of the form board, since these fasteners 140 are positioned on or near the foam board's perimeter. Assuming that the fasteners 140 that are partially within the foam board's border each count as half a fastener (i.e., since these fasteners are used to couple both the gray shaded foam board and an adjacent board) and that the fasteners 140 that are fully within the border count as a full fastener (i.e., since these fasteners are used to couple only the gray shaded foam board), the gray shaded foam board 130 includes approximately 19 fasteners.

The gray shaded foam board 130 may include slightly more (i.e., 20, 21, and the like) or slightly fewer (i.e., 17, 18, and the like) depending on whether a particular fastener 140 is fully or partially within the gray shaded board's border. Assuming that the gray shaded foam board 130 includes 19 fasteners and has a surface area of approximately 4608 $in^2$ (i.e., 96 in*48 in), the fastener density may be determined by dividing the surface area by the number of fasteners, which provides a fastener density of 1 fastener per approximately 242 $in^2$ (i.e., 4608 $in^2$/19).

If the vertical spacing $S_1$ of fasteners 140 is reduced to about 9 inches so that the gray shaded foam board include 36 fasteners within its border, a density of about 1 fastener per 120 $in^2$ is provided, whereas 18 fasteners within the board's border provides a fastener density of about 1 fastener per 256 $in^2$. These fastener densities are far less than the fastener densities provided by conventional wall assemblies. As further shown in FIG. 3A, the number of fasteners 140 used may be increased where a seam between adjacent panels abuts another panel. The usage of more fasteners 140 in these areas may prevent a single fastener from fastening more than two boards.

Further, when exterior sheathing 120 is applied between the foam boards 130 and wall studs 110, the vertical spacing $S_1$ of the fasteners 140 may be increased to about 24 inches, which results in the gray shaded foam board 130 having approximately 12-14 fasteners 140. The exterior sheathing 120 functions to provide increased structural support to the wall assembly 100, which allows the spacing between fasteners 140 to be increased vertically. In such embodiments, the fastener density may be between about 1 fastener per 330 in$^2$ and 1 fastener per 384 in$^2$. It is believed that as the thickness of the foam board 130 increases for walls where a foam insulation is applied directly to the framing, that the capped fastener spacing may be increased. The amount of increase is believed to be up to 24" on center fastener spacing for foam board 130 thicknesses over about 2.5" thickness.

Figure 3B:
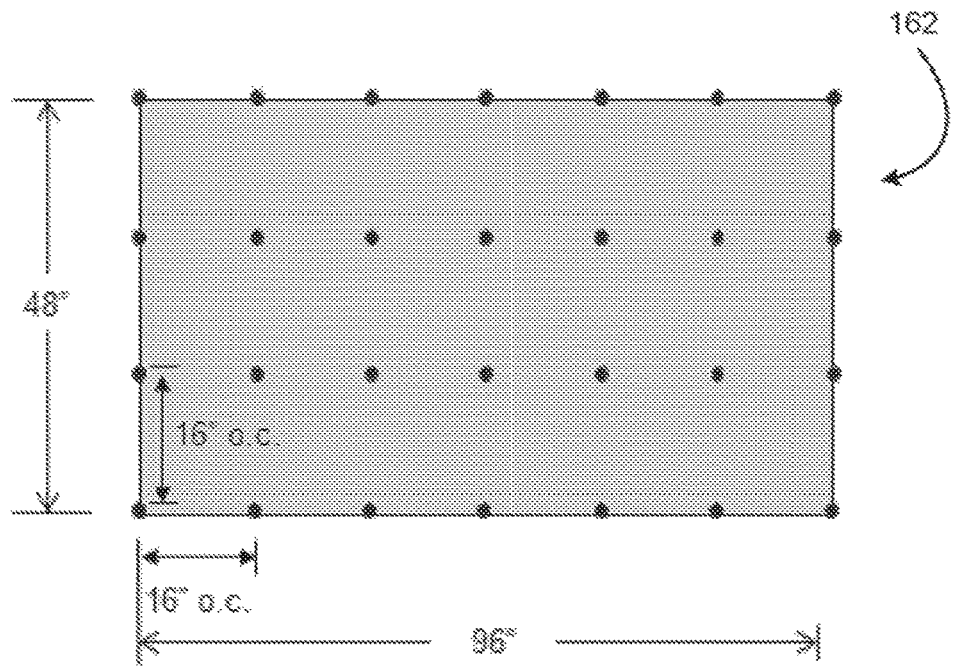
FIGS. 3B & 3C are front views of alternative continuous insulative wall assemblies according to an embodiment.

Referring now to FIG. 3B, illustrated is an embodiment 162 of another fastener pattern relative to foam board 130. The embodiment 162 illustrates a foam board 130 having a length of approximately 96 inches and a width of approximately 48 inches. The foam board 130 may be an interior board, or have an interior placement or arrangement, with respect to a continuous insulative wall assembly. Each fastener of embodiment 162 has an on center spacing from an adjacent fastener of approximately 16 inches. The foam board 130 of embodiment 162 includes 18 perimeter fasteners that each contribute ½ fastening load in securing the foam board 130 to a frame as described above. The foam board 130 of embodiment 162 further includes 10 field fasteners, or fasteners that are positioned fully within the foam board's border, which each contribute a full fastening load in securing the foam board 130 to a frame. Accordingly, foam board 130 of embodiment 162 includes a total fastener contribution of approximately 19 (i.e., 18/2+10). The resulting fastener density of embodiment 162 is approximately 1 fastener per 243 in$^2$.

Figure 3C:
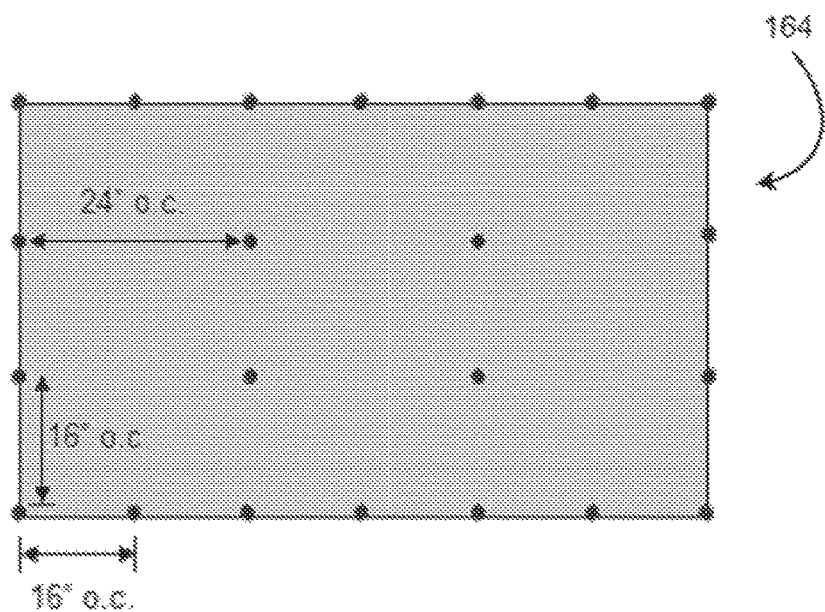

Referring now to FIG. 3C, illustrated is an embodiment 164 of another fastener pattern relative to foam board 130. The embodiment 164 illustrates a foam board 130 having a length of approximately 96 inches and a width of approximately 48 inches. The foam board 130 may be an interior board of a continuous insulative wall assembly. The perimeter fasteners of embodiment 164 have an on center spacing from adjacent fasteners of approximately 16 inches. The field fasteners (i.e., fasteners positioned within the foam board's border), however, have an on center spacing of approximately 16 inches from adjacent fasteners in a widthwise direction and an on center spacing of approximately 24 inches from adjacent fasteners in a length-wise direction. Accordingly, the foam board 130 of embodiment 164 includes 18 perimeter fasteners that each contribute ½ fastening load in securing the foam board 130 to a frame and includes 4 field fasteners, which each contribute a full fastening load in securing the foam board 130 to a frame. Accordingly, foam board 130 of embodiment 164 includes a total fastener contribution of approximately 13 (i.e., 18/2+4). The resulting fastener density of embodiment 164 is approximately 1 fastener per 354 in$^2$.

Figure 4:
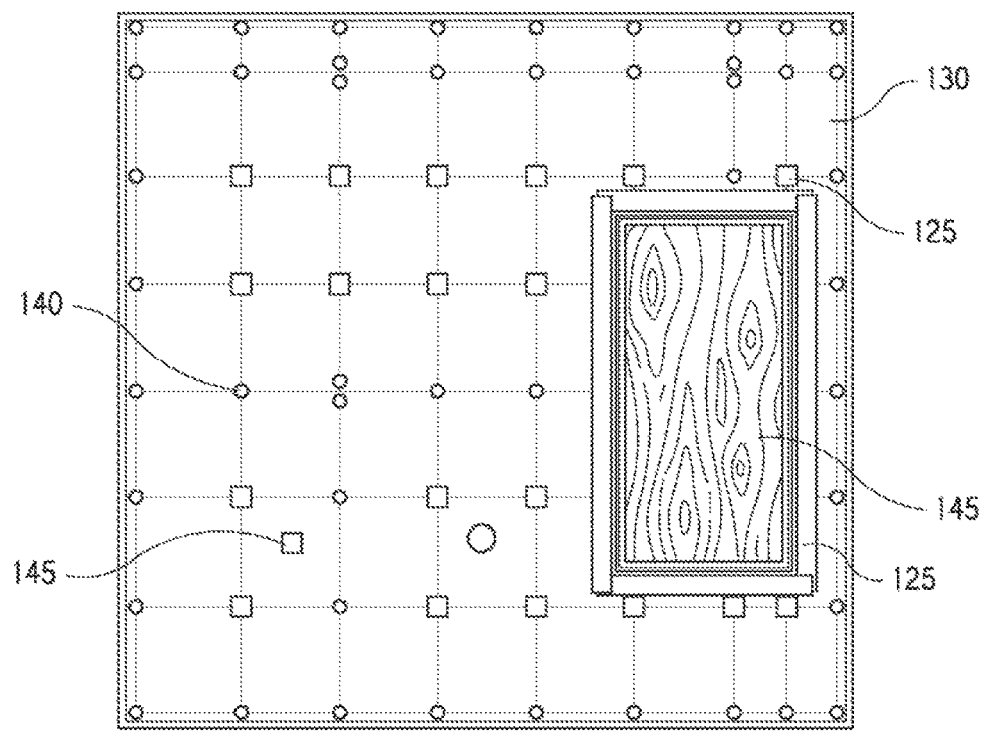
FIG. 4 is a front view of another continuous insulative wall assembly according to an embodiment.
Figure 5:
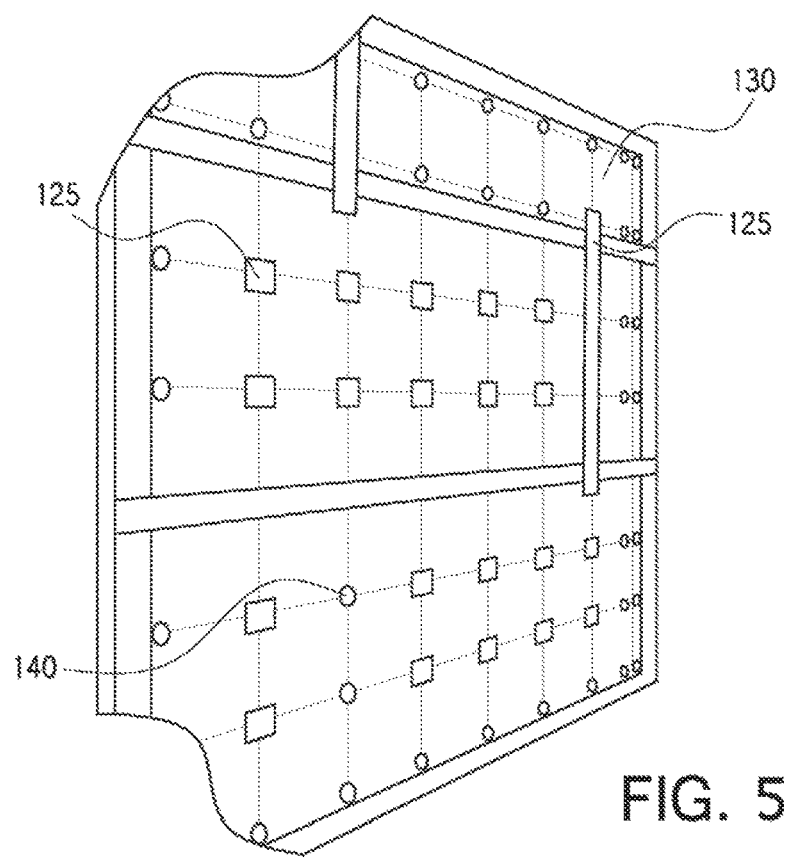
FIG. 5 is a perspective view of a continuous insulative wall assembly according to an embodiment.

Referring now to FIGS. 4 and 5, illustrated are wall assemblies that are produced according to the embodiments described above. Specifically, FIG. 4 illustrates a wall assembly having a plurality of insulative foam boards 130 that are coupled together with fasteners 140 as described above. Sealing tape 125 is positioned over the seams between adjacent foam boards 130 and also positioned over all or some of the fasteners 140 so as to create an air barrier around these seams or gaps. The wall assembly also includes one or more penetrations 145 that project through the foam board 130's surface. The penetrations 145 may include vents, ducts, windows, doors, electrical boxes, and the like as is common in the art. To create air barriers around these penetrations 145, the sealing tape 125 and/or sealing caulk is positioned and adhered around the seams or gaps between the foam boards 130 and the penetrations 145. FIG. 5 also illustrates a plurality of foam boards 130 that are coupled together through create a continuously insulated wall as described herein. The seams and/or gaps between adjacent panels 130 are covered via sealing tape 125 as are the fasteners 140 that are used to couple the foam boards 130 to a frame positioned behind the foam boards (not shown).

Experimental

The wall assembly of FIG. 5 was created without an intermediate layer of exterior sheathing and without spray foam in the stud cavities. The wall was then tested to determine the effectiveness of the air barrier created. It was determined that the wall assembly was able to deliver an air barrier that restricted airflow through the wall to less than 0.2 L/(s-m$^2$) a pressure of approximately 75 Pa. This air barrier performance is acceptable for use in the majority of areas, including hurricane regions. The wall assembly was also able to deliver a structural lateral wind resistance performance up to approximately 2195 Pa. As such, the wall assembly may serve as the Main Wind Force Resisting System (MWFRS) as defined by the ASCE 7 standard. It is believed that the capped fastener designs (e.g., cap diameter of approximately 2 inches) was a key system element that allowed large scale full wall test specimens to withstand extreme negative wind pressure loads. Further, the wall assemblies described herein (e.g., foam board secured directly to the framing and without an intermediate layer of gypsum sheathing, foam board secured to framing with an intermediate layer of gypsum sheathing, and the like) were determined to deliver unexpected passing performance in the NFPA 285 commercial wall fire test when constructed with non-combustible claddings such as brick, stucco, stone concrete, and terracotta.

Fastener Embodiments

Figure 6A:
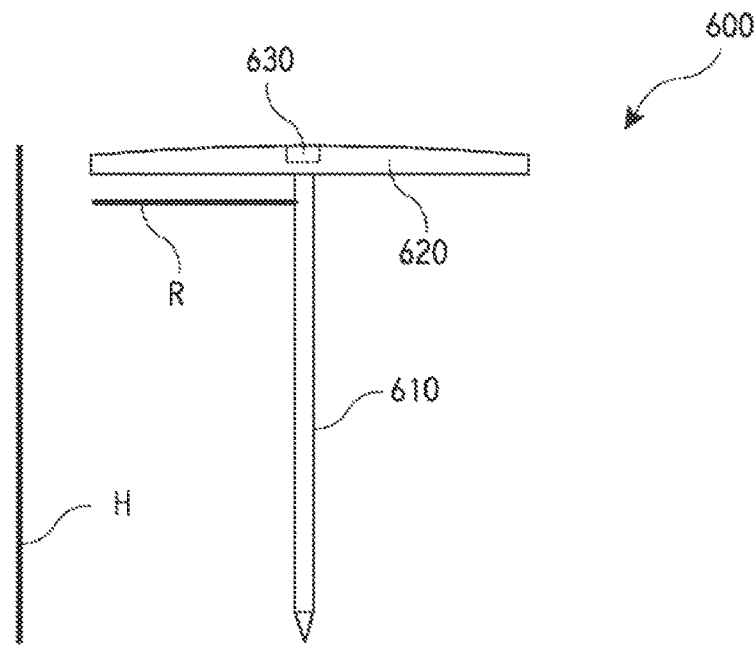
FIGS. 6A-D are various views of a fastener that may be used to couple components of the continuous insulative wall assembly according to an embodiment.
Figure 6B:
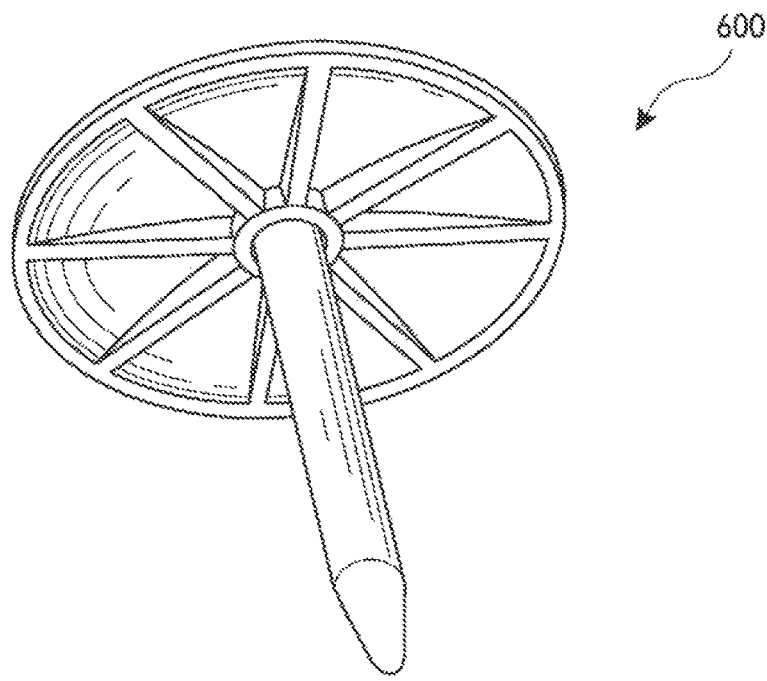
Figure 6C:
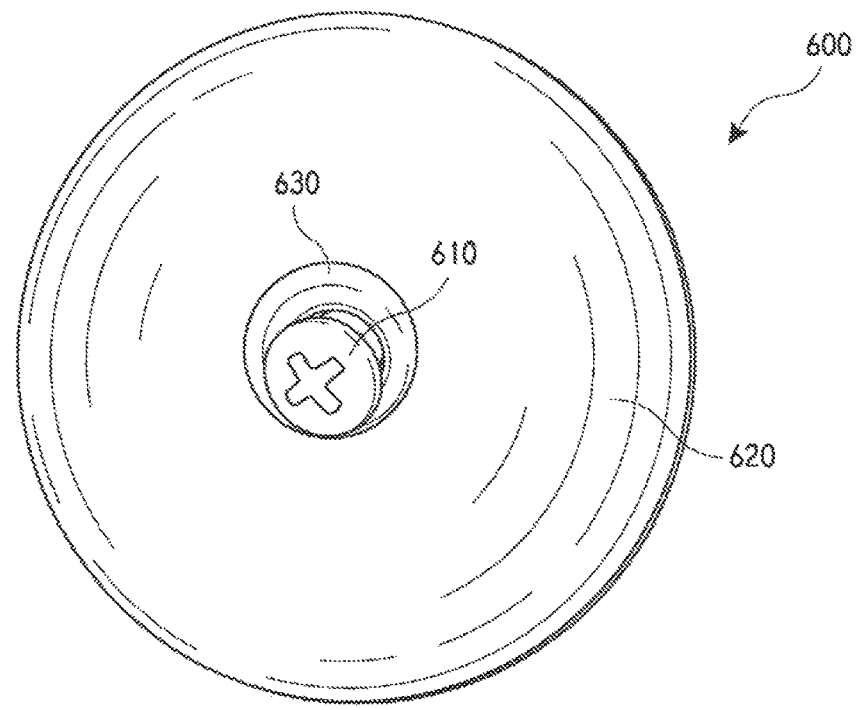
Figure 6D:
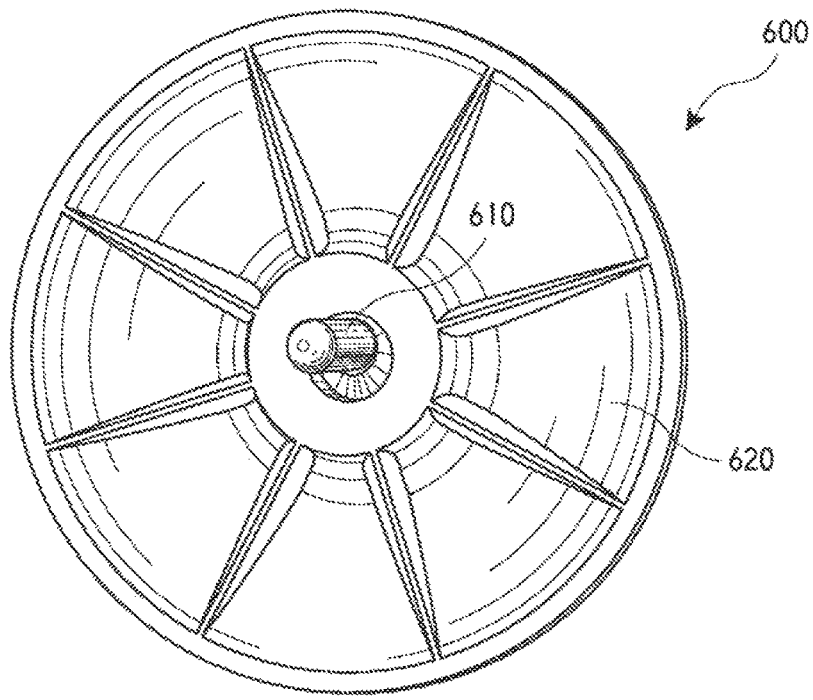

Referring now to FIGS. 6A-D, illustrated are embodiments of a fastener 600 that may be used to couple the insulative foam boards and/or exterior sheathing to the wall studs of a frame. Fastener 600 includes an elongate shaft 610 having a sharpened distal end that allows the fastener 600 to be inserted through the foam boards, exterior sheathing, and coupled directly to wall studs. Fastener 600 also includes a cap 620 that extends radially from the elongate shaft 610. The cap 620 is configured to be positioned atop and pressed against the insulative foam boards when the fastener 600 is used to couple the foam board and/or exterior sheathing with the wall assembly's frame. The cap 620 has a relatively large radius R measured from elongate shaft 610 of between about 0.5 and 2 inches, and preferably 1 inch. This large cap 620 radius R allows the fastener 600 to distribute a load relatively evenly atop the foam board as described previously. The load distribution property of fastener 600 allows fewer fasteners to be used in securing the insulative board to the frame. The cap 620 also includes a recessed portion 630 that allows the elongate shaft 610 to be inserted through the cap 620 such that a proximal portion of the elongate shaft 610 is recessed within cap 620. In this configuration, the proximal portion of the elongate shaft 610 remains within the recessed portion of the cap 620 rather than protruding axially therefrom. Cap 620 may also have a height of about 0.3 inches. Fastener 600 may include a height H of between about 1.25 and 6.00 inches. FIG. 6B illustrates a perspective view of fastener 600. FIGS. 6C and 6D are front and rear view of fastener 600.

Method Embodiment

Figure 7:
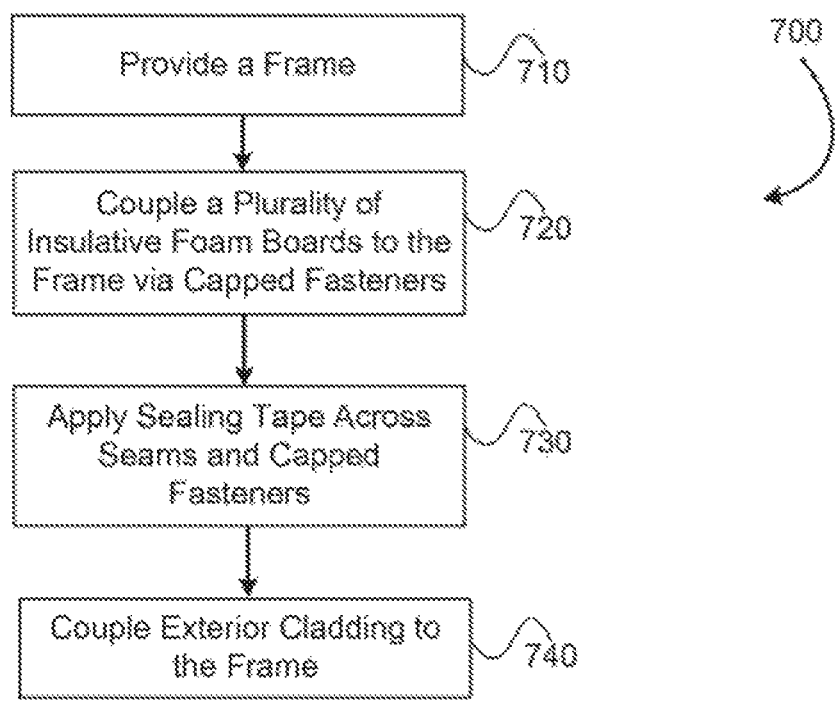
FIG. 7 is a method for providing a continuous insulative wall assembly according to an embodiment.

Referring now to FIG. 7, illustrated is a method 700 for providing a continuously insulated wall. At block 710, a frame is provided and, in some embodiments, exterior sheathing may be installed. The frame includes a plurality of structural support members (e.g., wall studs) that are attached or coupled together. At block 720, a plurality of insulative foam boards are coupled to the frame so as to form a continuous insulative wall or surface of the structure. The plurality of insulative foam boards are coupled to the frame via a plurality of fasteners that have an elongate shaft portion that penetrates through a respective insulative foam board and into a respective structural support member to attach the respective insulative foam board to the respective structural support member.

The fastener including a cap portion having a 2 inch diameter. The cap portion is positioned atop the respective insulative foam board when the fastener is inserted through the respective insulative foam board and into a respective structural support member so as to distribute an applied load relatively evenly to the insulative foam board. The fasteners are applied to the insulative foam board so as to have a spacing between adjacent fasteners of about 16 inches. At block 730, a sealing tape is applied across seams between adjacent foam boards and across at least some, and preferably all, the capped fasteners to seal the continuous insulative wall or surface. The sealing tape has a tape width of about 4 inches and is able to elongate or deform when under tension or shear. The continuous insulative wall or surface provides an air barrier that restricts a passage of air through the wall to less than about 0.2 L/(s-m$^2$) at a pressure of 75 Pa.

At block 740, the method may also include coupling cladding to the frame to form an exterior wall of the structure that is protective and visually pleasing. The cladding may be coupled to the frame via a second plurality of fasteners that are attachable to the cladding, that extend through respective insulative foam boards, and that attach to respective structural support members. The cladding may be offset from the insulative foam boards so as to form an air gap between the insulative foam boards and the exterior cladding.

In some embodiments, the continuously insulated wall includes a hollow cavity between adjacent structural support members (e.g., wall studs). The hollow cavity may be approximately equal in length to the structural support members. In some embodiments, the method may further include positioning a plurality of sheathing panels between the frame and the insulative foam boards prior to coupling the insulative foam boards with the frame. In other embodiments, the insulative foam boards may be positioned directly adjacent the frame. The method may additionally include coupling a plurality of wallboards to the frame so as to form an interior wall of the structure.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method for providing a continuously insulated wall, the method comprising:
    providing a frame comprising a plurality of structural support members coupled together, the frame comprising a plurality of cavities defined by adjacent structural support members;
    positioning a plurality of insulative foam boards adjacent the frame so as to form a continuous insulative wall or surface over the frame;
    coupling the plurality of insulative foam boards to the frame with a plurality of fasteners, each fastener having an elongate shaft that penetrates through one of the respective insulative foam boards and into one of the structural support members so as to attach the insulative foam board to the structural support member, the fastener being positioned within a cap such that the elongate shaft is flush or recessed below a top surface of the cap, the cap being positioned on the insulative foam board when the elongate shaft is inserted through the insulative foam board and into the structural support member so as to distribute an applied load to the insulative foam board, wherein a shape of the cap is configured to hinder insertion of the cap into the insulative foam board and over insertion of the elongate shaft into the insulative foam board;
    applying a sealing tape over seams between adjacent insulative foam boards and over the cap of each and every fastener which penetrates through the plurality of insulative foam boards and into the plurality of structural support members of the continuous insulative wall so as to seal the continuous insulative wall and form an air barrier to restrict airflow through the continuous insulative wall; and
    filling the plurality of cavities with insulation.

2. The method of claim 1, wherein the cap is circular and has a diameter of 1-4 inches.

3. The method of claim 1, wherein the fasteners are applied to the plurality of insulative foam boards so as to have a spacing between each adjacent fastener of at least 16 inches.

4. The method of claim 1, wherein the airflow through the continuous insulative wall is less than about 0.2 L/(s-m$^2$) at a pressure of 75 Pa.

5. The method of claim 1, wherein the sealing tape comprises a stretchable plastic film with an acrylic adhesive, the sealing tape being elastic so as to have greater than 100% strain capability in both a machine direction and cross machine direction.

6. The method of claim 1, further comprising coupling cladding to the frame so as to form an exterior wall, the cladding being coupled to the frame via at least the plurality of fasteners and a second plurality of fasteners.

7. The method of claim 1, wherein the cap and the elongate shaft are separate pieces configured to couple together.

8. The method of claim 1, wherein the plurality of fasteners are self-sealing to block or reduce the airflow through the continuous insulative wall.

9. A method for insulating a structure, the method comprising:
   coupling a plurality of structural support members together to form a frame for a wall or ceiling, the frame comprising a plurality of cavities defined by adjacent structural support members;
   coupling a plurality of sheathing panels directly to the frame;
   coupling a plurality of insulative foam boards atop the plurality of sheathing panels and to the frame to form a continuous insulative wall or surface, the plurality of insulative foam boards being coupled to the frame via a plurality of fasteners, each fastener having a respective elongate shaft that is insertable through a respective insulative foam board and sheathing panel and into a respective structural support member so as to attach the respective insulative foam board and sheathing panel to the respective structural support member, wherein the fasteners each include a respective cap that extends radially from the elongate shaft and that is positionable on the respective insulative foam board so as to distribute an applied load about the respective insulative foam board, wherein a shape of the cap is configured to hinder over insertion of the elongate shaft into the respective insulative foam board; and
   applying a sealing tape across seams between adjacent insulative foam boards and over the cap of each and every fastener of the continuous insulative wall or surface which penetrates through the plurality of insulative foam boards and into the plurality of structural support members so as to seal the continuous insulative wall or surface so that the continuous insulative wall or surface forms an air barrier to restrict airflow through the wall.

10. The method of claim 9, comprising filling the plurality of cavities with insulation.

11. The method of claim 10, wherein the insulation comprises fiberglass.

12. The method of claim 9, comprising coupling cladding to the frame so as to form an exterior wall, the cladding being coupled to the frame with at least one of the plurality of fasteners and a second plurality of fasteners.

13. The method of claim 12, wherein the cap and the elongate shaft are one-piece.

14. The method of claim 9, wherein the sheathing panels comprise wood based boards or gypsum boards.

15. An insulated structure comprising:
   a structural base;
   a plurality of insulative foam boards attached to the structural base to form a continuous insulative wall or surface of the structure;
   a plurality of fasteners that attach the insulative foam boards to the structural base, wherein each fastener comprises an elongate shaft that penetrates through a respective insulative foam board and into the structural base, wherein each fastener comprises a cap that extends radially from the elongate shaft, the cap having a recess, wherein the elongate shaft does not protrude axially outward from the cap, the cap being positioned atop the respective insulative foam board to distribute an applied load to the respective insulative foam board, wherein a shape of the cap is configured to hinder over insertion of the elongate shaft into the respective insulative foam board; and
   a sealing tape applied across seams between adjacent insulative foam boards and over the cap of each and every fastener of the insulative structure which penetrates through the plurality of insulative foam boards and into the structural base to seal the continuous insulative wall or surface so that the continuous insulative wall or surface forms an air barrier to restrict airflow through the continuous insulative wall.

16. The structure of claim 15, wherein the cap and the elongate shaft are separate pieces configured to couple together.

17. The structure of claim 15, wherein the plurality of fasteners are self-sealing to block or reduce the airflow through the continuous insulative wall.

18. The structure of claim 15, comprising insulation between the structural base and the continuous insulative wall.

* * * * *